US006738386B1

United States Patent
Holmqvist

(10) Patent No.: US 6,738,386 B1
(45) Date of Patent: May 18, 2004

(54) CONTROLLED LATENCY WITH DYNAMICALLY LIMITED QUEUE DEPTH BASED ON HISTORY AND LATENCY ESTIMATION

(75) Inventor: Ryan S. Holmqvist, Basking Ridge, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/569,311

(22) Filed: May 11, 2000

(51) Int. Cl.$^7$ .............................................. H04L 12/56
(52) U.S. Cl. ...................................... 370/412; 370/428
(58) Field of Search .............................. 370/230, 230.1, 370/252, 412, 413, 417, 428, 517

(56) References Cited

U.S. PATENT DOCUMENTS

| | | | | |
|---|---|---|---|---|
| 6,141,323 A | * | 10/2000 | Rusu et al. | 370/236 |
| 6,175,554 B1 | * | 1/2001 | Jang et al. | 370/229 |
| 6,466,579 B1 | * | 10/2002 | Scott et al. | 370/395.71 |
| 6,535,484 B1 | * | 3/2003 | Hughes et al. | 370/230 |

* cited by examiner

*Primary Examiner*—Chau Nguyen
*Assistant Examiner*—Robert C Scheibel
(74) *Attorney, Agent, or Firm*—William H. Bollman

(57) ABSTRACT

A priority history module monitors the past history of data packets submitted to the hardware queue with respect to two or more priority levels. The priority queuing module may use any suitable arbitration or other algorithm to order the submission of data packets of varying priorities from the various software data queues, as is otherwise conventional, particularly when data packets of all types of priorities are currently waiting for submission to the transmit data queue. However, when an absence of a particular priority level occurs (e.g., when no highest priority data packets are waiting for submission), then latency of the transmit data queue is adaptively balanced with throughput of the transmit data queue, in accordance with the principles of the present invention. Latency of the data packets currently in the relevant data queue may be estimated to further qualify the adaptively adjusted limit to the data queue.

24 Claims, 6 Drawing Sheets

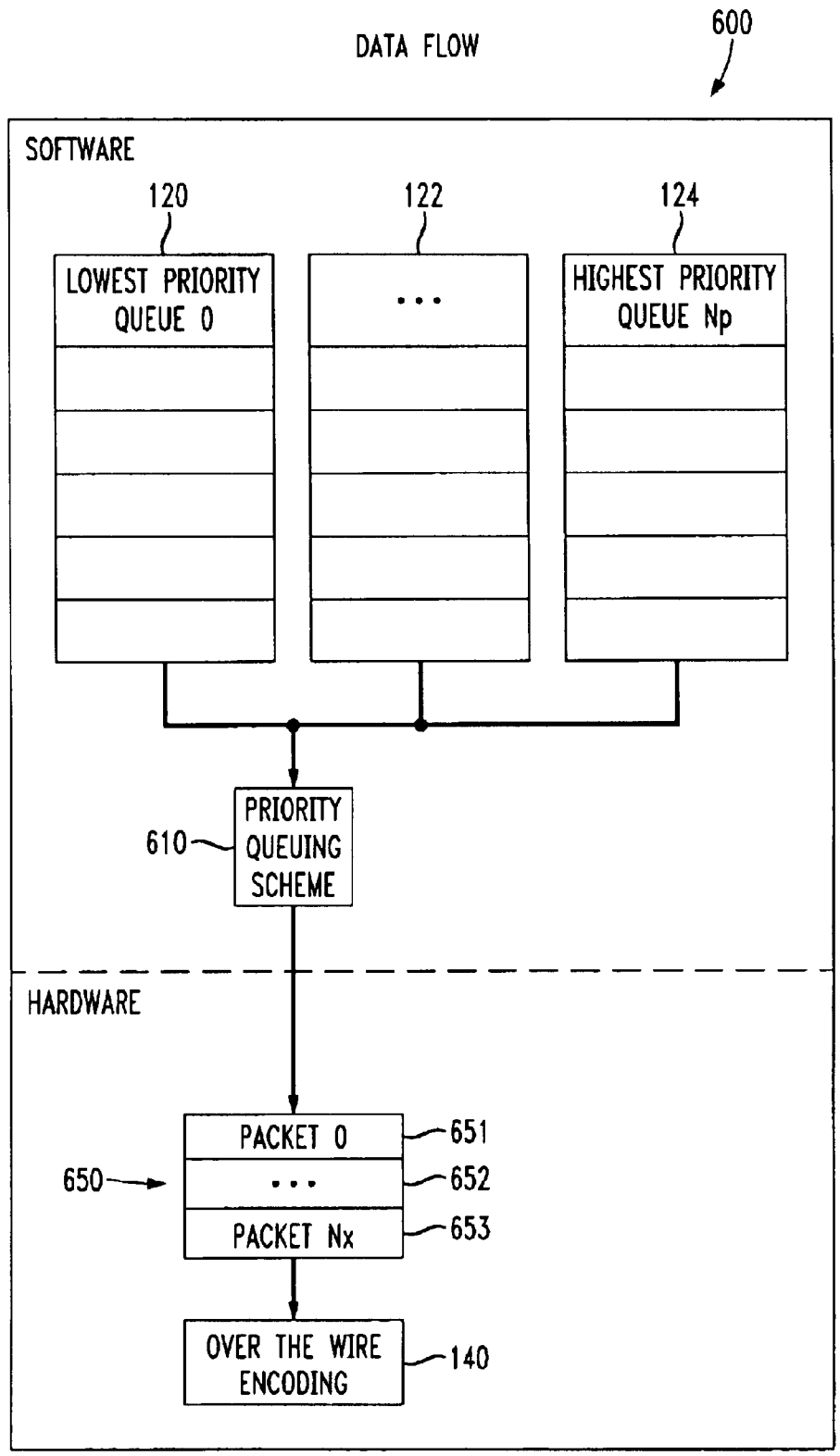

CONTROLLED LATENCY WITH DYNAMICALLY LIMITED QUEUE DEPTH BASED ON HISTORY AND LATENCY ESTIMATION

BACKGROUND OF THE INVENTION

1. Field of the Invention

This invention relates generally to queuing techniques. More particularly, it relates to an efficient and reliable technique and apparatus for queuing high priority data for processing (e.g., for transmission) without risk of high latency due to prior queued lower priority data.

2. Background of Related Art

Queues are generally used by communications systems as a sort of holding bin for data packets after they are prepared for transmission, but before they are actually processed for transmission.

For instance, FIG. 6 shows the relevant portion of an exemplary transmission system including one or more software queues 120–124 containing data packets for transmission.

In particular, as shown in FIG. 6, the software queues 120–124 contain data of varying degrees of priority for transmission. For instance, data packets corresponding to a lower priority data transmission may relate, e.g., to the uploading of a web page, while a higher priority data transmission may relate, e.g., to a video or audio transmission. The particular priority levels assigned to various data packets may be determined by the particular application.

A priority queuing scheme 610 typically includes the relevant algorithms and/or arbitration rules to determine a fair ordering of data packets for transmission by the transmission system in a hardware portion of the transmission system. Generally speaking, a higher priority data packet will typically be pulled from the high priority queue 124 more frequently than will be lower priority data packets from a lower priority queue 120, so as to conform to desired latency requirements. Latency requirements relate to the maximum delays which will be incurred by any particular data packet, e.g., from the time it is placed on the relevant software queue 120–124 until the time that it finally gets pulled from a hardware queue 650 for appropriate encoding and transmission, e.g., by an RF front end.

A typical priority queuing routine in the priority queue module 610 will look at the contents of the various software priority queues 120–124, and determine which packet should be next added to the hardware transmit queue 650. Typical priority queuing routine considers, e.g., which packets are available, fairness, priority, throughput, transmit latency, and many other factors when deciding which data packet should be queued next into the hardware queue 650.

However, most priority queuing schemes do not work well when higher priority queues are temporarily empty. For instance, if there are only low priority packets available in the lowest priority queue 120 and no data packets available in the highest priority queue 124, then the priority queuing routine in the priority queue module 610 will fill the hardware transmit queue 650 with only low priority data. This may occur over a period of time, filling up the hardware queue 650 with only low priority packets, which must be cleared (i.e., transmitted) before the hardware queue 650 can accept any additional data packets for transmission. Although it is usually desirable to keep the hardware queue 650 as full as possible to optimize throughput, once a higher priority packet finally becomes available, the high priority packet will be placed onto the end of the hardware transmit queue 650, and may even have to wait for placement on the hardware queue 650, causing significant latency delays.

The typical conventional hardware transmit queue cannot easily be reordered, e.g., by software. This is because software reordering might create a race condition between the hardware and the software accessing the same hardware transmit queue 650. Moreover, hardware reordering of a hardware transmit queue 650 would be costly to implement, and/or result in a slower operation of the hardware transmit queue 650. Thus, the higher priority data packet, once reappearing in the higher priority software queue 124, will be forced to experience a significant latency. This significant latency would include time it would take to transmit all low priority packets already in the hardware transmit queue 650 at the time that the higher priority data packet gets queued into the hardware transmit queue 650. Moreover, in such situations, the significant latency time for the higher priority data packet may risk violation of latency constraints on the higher priority data packet.

The hardware transmit queue 650 could be made statically smaller to shorten the latency time through the hardware transmit queue 650, but this would tend to decrease the throughput of the transmission system.

Accordingly, there is a need for an efficient and reliable queuing technique and apparatus which provides sufficient and reliable servicing of high priority data at all times without necessarily causing a sacrifice in throughput.

SUMMARY OF THE INVENTION

In accordance with the principles of the present invention, a data packet queue comprises a priority queuing module adapted to submit to a data queue data packets in accordance with a priority of the data packets. A priority history module is adapted to monitor a history of priority levels of data packets submitted to the data queue. A depth of the hardware data queue is adaptively limited based on the monitored history of the priority levels of data packets.

A method of balancing latency with throughput in a data packet queue in accordance with another aspect of the present invention comprises determining a priority level history with respect to past submissions to the data packet queue. A depth of the data packet queue is adaptively adjusted based on the determined priority level history.

BRIEF DESCRIPTION OF THE DRAWINGS

Features and advantages of the present invention will become apparent to those skilled in the art from the following description with reference to the drawings, in which:

FIG. 6 shows the relevant portion of an exemplary transmission system including one or more software queues containing data packets for transmission.

DETAILED DESCRIPTION OF ILLUSTRATIVE EMBODIMENTS

Figure 1:
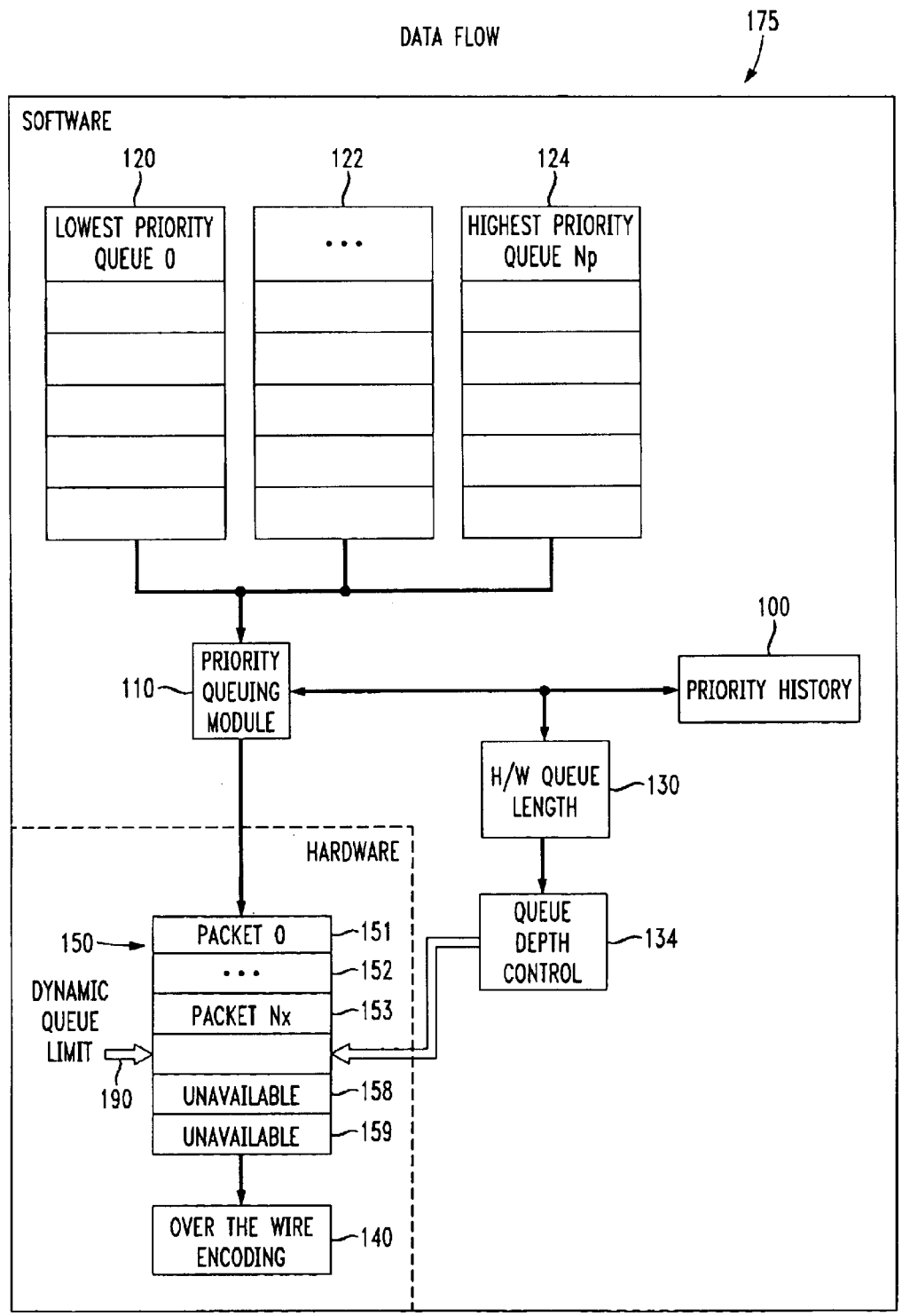
FIG. 1 shows a simple embodiment of an adaptively constrained data queue based on priority history of past submissions to the data queue, in accordance with the principles of the present invention.

The present invention dynamically limits an output queue (e.g., a transmit queue) in accordance with an appropriate parameter, e.g., a history of priority transmissions, and/or on latency estimation.

A 'history' of the priority level of data packets submitted to the relevant data queue (e.g., their recency and/or periodicity) provides a priority queuing module insight not dissimilar to a memory cache as to the likelihood and priority of soon to follow data packets. Based on the recent absence of high priority data through a data queue, the data queue can be adaptively and/or dynamically deepened to increase throughput. Similarly, based on the recent presence of high priority data, the data queue can be limited to a depth shorter than otherwise allowed to ensure compliance with a desired latency before transmission of the higher priority data packet.

In particular, in accordance with the principles of the present invention, if a particular data queue (e.g., a hardware transmit data queue leading toward an over the wire signal encoder and RF front end) has a recent 'history' of passing high priority data packets, then it is more likely that in the near future there will be a need to pass high priority data packets. In this scenario, the hardware queue is limited to a shorter depth. While decreasing overall throughput of the hardware data packet queue, a maximum latency requirement for the higher priority data packets can be assured.

On the other hand, if recent history of a particular data queue indicates that a high priority data packet has not been transmitted for a particular length of time (i.e., recently), then the depth of the relevant data packet queue can be increased. This scenario presumes that since a higher priority data packet had not been sent recently, that it is more likely that a higher priority data packet may not be sent in the near future. Thus, the adjusted limit to the relevant data packet queue provides greater throughput with a reduced risk of violating the maximum latency requirements of a higher priority data packet.

When higher priority data packets again appear for submission to the relevant data packet queue, the depth of the data queue can be again decreased as appropriate (e.g., by not accepting new lower priority submissions to the data queue and reducing the effective depth of the data packet queue) to move the system towards satisfaction of the higher priority data packets, if not for the initial higher priority data packet after a long absence then for the subsequent higher priority data packets.

Alternative to or in addition to the recency of the priority of submissions, the 'history' of the priority level can be determined based on a characteristic of the submissions from a particular source and/or having a particular priority level. For instance, one characteristic of submissions useful for basing a history of the priority level is periodicity.

Periodicity relates to the frequency or regularity of submissions from a particular source. A high level of periodicity may correspond to a higher priority level, and vice versa.

Some types of very regular or periodic data streams are less tolerant to latency than other types. For instance, data relating to a web page will tolerate latency less noticeably than will a video or audio data stream.

Data packets relating to video and/or audio feeds will typically have a fairly regular appearance in a data queue. This periodicity (or regularity) of data from a particular source can be used to place a higher priority on future data packets from that same source (at least until the periodicity or regularity decreases).

Thus, using a dynamic transmit queue depth in accordance with the principles of the present invention, a maximum latency requirement can be adaptively constrained and balanced with throughput of the system, without permanently reducing throughput.

FIG. 1 shows a simple embodiment of an adaptively constrained data queue based on priority history of recent submissions to the data queue, in accordance with the principles of the present invention.

In particular, as shown in FIG. 1, the depth of a particular data queue, e.g., hardware transmit data queue 150, may be limited in accordance with the recent history of the priority level of data packets submitted to the transmit data queue 150.

A priority history module 100 monitors the recent history of data packets, e.g., by monitoring data packets submitted to various software data queues 120–124, and/or by monitoring data packets submitted to the hardware queue 150 with respect to two or more priority levels. The priority queuing module 110 may use any suitable arbitration or other algorithm to order the submission of data packets of varying priorities from the various software data queues 120–124, as is otherwise conventional, particularly when data packets of all types of priorities are currently waiting for submission to the transmit data queue 150. However, when an absence of a particular priority level occurs (e.g., when no highest priority data packets are waiting for submission), then latency of the transmit data queue 150 is adaptively balanced with throughput of the transmit data queue 150, in accordance with the principles of the present invention.

The recent history of, e.g., higher priority data packets is determined by the priority history module 100, and provided to a priority queuing module 110 for adaptively adjusting the depth of the transmit data queue 150.

The depth of the relevant data packet queue 150 may be limited in any appropriate fashion. For instance, the depth may be affected by the priority queuing module 110 by submitting fewer or greater numbers of data packets to the transmit data queue for each data packet processed at the output, e.g., by the over the wire encoder 140 and subsequent RF front end. Alternatively, and/or additionally, the depth of the transmit data queue 150 may be adaptively adjusted with relevant hardware based on the current desired length of the data queue 130 and appropriate queue depth control 134 affecting the desired depth to the transmit data queue 150.

The 'recent' history preferably relates to a number of queued data packets beyond those currently held by the relevant data packet queue.

Using a history of priority transmissions technique, a history of the priorities that have been transmitted "recently"

are maintained in a database or other suitable storage area, and priorities that have not been transmitted "recently" are preferably removed from the history.

As proof of the concept, assume that if a high priority data packet has been recently transmitted, that it is more likely that another high priority data packet will be transmitted again in the near future. On the other hand, if a high priority data packet has not been transmitted recently, assume that it is more likely that a high priority data packet will probably not be transmitted in the near future. Given these assumptions, the priority level of data packets which are more probable to be sent in the near future can be determined.

The present invention utilizes the probability or likelihood of the priority of data packets to be sent in the near future to dynamically limit the number of data packets placed in a relevant data packet queue 150. This effectively limits the depth of the data queue 150 dynamically based on recent contents of the data queue 150.

The "recency" of the transmission of the last high priority data packet may be determined by any appropriate technique for the particular application. For instance, a "recent" high priority data packet transmission may be one in the past x number of transmissions, or it may be based on a percentage of the maximum length of the data queue 150. Alternatively, a timer could be implemented and used to provide "recency".

In accordance with the principles of the present invention, if a higher priority data packet is finally submitted to a data queue 150 for the first time after a period of time wherein it was not included in the recent history, then the latency of that higher priority data packet may be higher then expected. Using the principles of the present invention, the latency for high priority data packets entering the data queue 150 in the near future will benefit from a recalculated latency and commensurate shortening of the dynamic length data queue 150, in accordance with the principles of the present invention.

Figure 2:
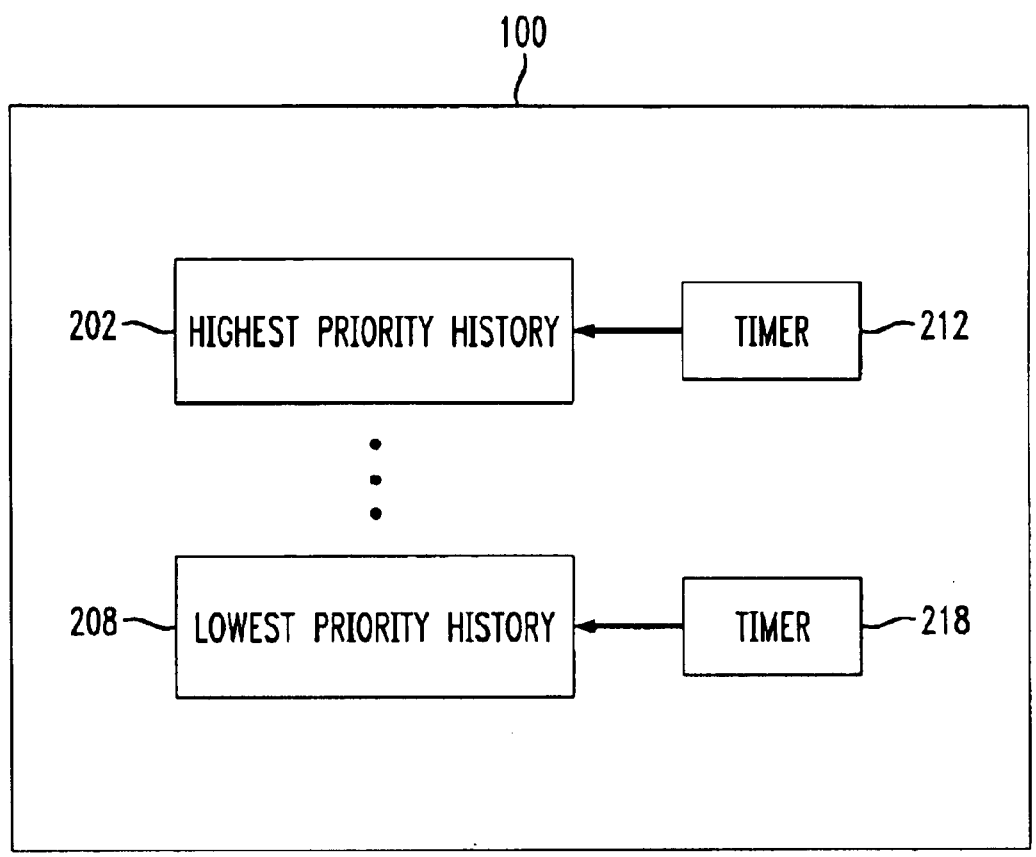
FIG. 2 shows in more detail an embodiment of a priority history module shown in FIG. 1.

FIG. 2 shows in more detail an embodiment of a priority history module 100 shown in FIG. 1.

In particular, the exemplary priority history module 100 comprises a plurality of monitoring functions 202, 208 to monitor the particular priority level of data packets as they are submitted to the relevant data queue (e.g., to the various software data queues 120–124), together with software timers 212, 218 to set the desired length of time of 'recent' history.

In operation, if the associated timer 212, 218 times out without the relevant priority history monitor 202, 208 having sensed a data packet having the relevant priority level, then that priority level will be determined to be 'absent' for recent history. In response, the priority queuing module will adaptively adjust the depth of the data queue 150.

The timers 212, 218 may continuously reset to the appropriate length of time after expiration, to measure 'recent' history in a series of time segments.

The timers 212, 218 are shown for ease of explanation only. For instance, instead of timers, the priority history monitors 202, 208 may search through the past 'x' number of data packets submitted to the transmit data queue 150 to put a time frame on what is to be considered 'recent' history.

Figure 3:
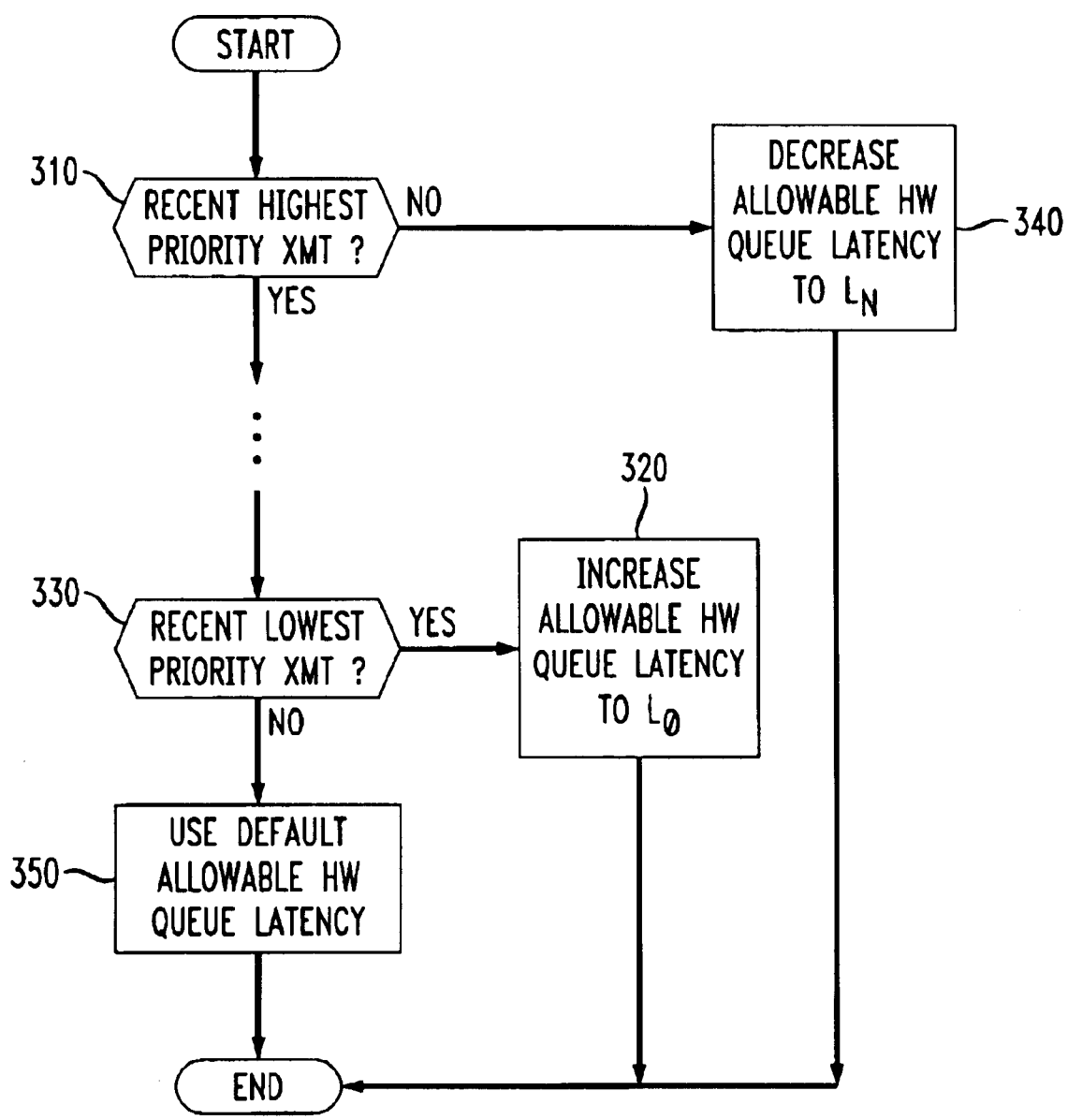
FIG. 3 shows an exemplary process flow diagram wherein the depth of a relevant data packet queue is adaptively adjusted based on a history of the priority level of data packets submitted to the relevant data packet queue, in accordance with the principles of the present invention.

FIG. 3 shows an exemplary process flow diagram wherein the depth of a relevant data packet queue is adaptively adjusted based on a recent history of the priority level of data packets submitted to the relevant data packet queue, in accordance with the principles of the present invention.

In particular, as shown in step 310 of FIG. 3, the priority level(s) of 'recent' submissions to the data queue 150 are determined. This priority level may relate to a number or percentage of the data packets which were at a particular priority level. Alternatively, the priority level of the recent submissions to the data queue 150 may be conglomerated into a common measurement, e.g., the average priority level of a data packet over a period of time (i.e., over 'recent' history). If a highest priority data packet (or a sufficient number over a given threshold) have been detected in 'recent' history, then the process moves on to step 330. However, if no (or few below a given threshold) data packets of the highest priority have been submitted to the data queue 150 in recent history, then adjustment of the data queue 150 may be desired to improve throughput in the presumed near future absence of highest priority data.

To that end, in step 340, the allowable hardware queue latency is decreased to improve the throughput of the data queue 150.

In step 330, the priority history module 100 may also monitor whether or not data packets of the lowest priority have been submitted by the various software data queues 120–124 in recent history. If so, then the default allowable hardware queue latency is used as shown in step 350, and the process ends. However, if data packets of the lowest priority have not been submitted recently to the various software data queues 120–124, then the allowable hardware queue latency is increased as shown in step 320.

Accordingly, if high priority packets have not been sent "recently", then the transmit data queue 150 will be allowed to grow and maximize throughput. The growth of the depth of the transmit data queue 150 may be gradual (e.g., step-wise over several transmissions), or immediate (e.g., at an appropriate time such as after x number of transmissions not having a high priority have been transmitted). In any event, the depth of the hardware queue becomes a function of the amount of data already in the hardware queue as well as the adaptive value of the allowable hardware queue latency.

Figure 4:
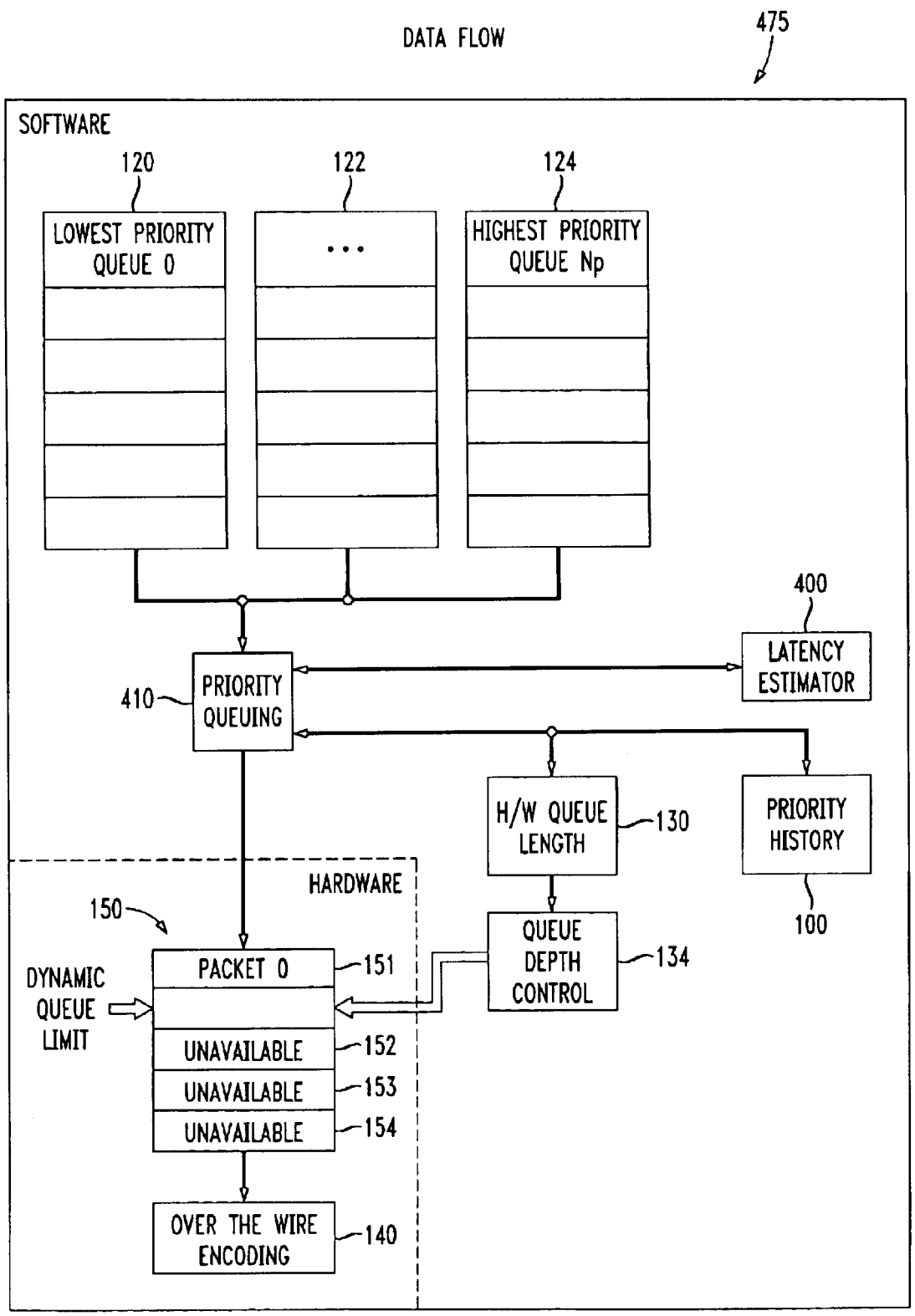
FIG. 4 shows the expansion of the principles of the present invention to accommodate a data queue having data packets of variable length. To this end, a latency estimator is included as a further variable in determination of the desired depth of the data queue based on the monitored history of the priority level of data packets recently submitted to the data queue, in accordance with the principles of the present invention.

FIG. 4 shows the expansion of the principles of the present invention to accommodate a data queue having data packets of variable length. To this end, a latency estimator 400 is included as a further variable in determination of the desired depth of the data queue 150 based on the monitored history of the priority level of data packets recently submitted to the various software data queues 120–124, in accordance with the principles of the present invention.

The depth of the data queue 150 can be further dynamically adjusted on a real-time based on an estimated latency calculated relating to the data packets 151 that are already in the transmit data queue 150.

In particular, as shown in FIG. 4, a latency estimator 400 is included to further refine the desired depth of the adaptively limited data queue 150. Thus, the data queue 150 is not only adaptively adjusted based on recent priority history, but also based on the actual content of the data queue 150 (and estimated latency for processing that actual content).

The latency calculation may utilize any suitable measurement mechanism, e.g., a number of bytes, a priority, an encoding rate, an error rate, a number of re-transmissions, and/or any other suitable parameter relating to latency.

The estimated latency of the data packets remaining in the data queue 150 is preferably updated as data packets are successfully transmitted and removed from the data queue 150.

Using estimated latency information relating to data packets remaining in a data queue 150, and dynamically adjusting the depth of the data queue 150 based on this estimated latency, a priority queuing scheme will not be permitted to fill up a data queue 150 with only or mostly low priority data, thereby avoiding violation of latency constraints of late arriving higher priority packets.

Figure 5:
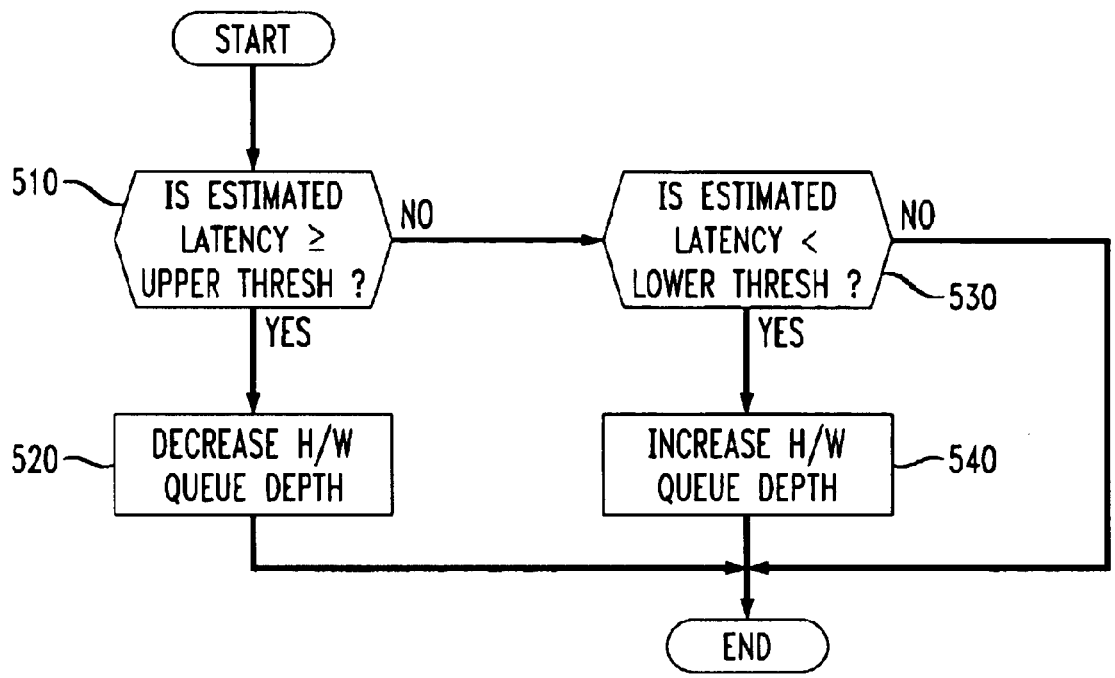
FIG. 5 shows an exemplary process for adaptively adjusting the depth of a data queue based on a priority history of submitted data packets together with an estimated latency of data packets currently in the data queue, in accordance with the principles of the present invention.

FIG. 5 shows an exemplary process for adaptively adjusting the depth of a data queue based on a priority history of recently submitted data packets together with an estimated latency of data packets currently in the data queue 150, in accordance with the principles of the present invention.

In particular, as shown in step 510 of FIG. 5, the latency of the current contents of the data queue 150 are estimated based on any appropriate tool, e.g., historical information regarding latency for the particular priority level of the data packets in the data queue 150, for the particular length of data packets, etc.

In step 520, if the latency is above a desired upper threshold level, the depth of the data queue 150 will be qualified or decreased appropriately.

Similarly, as shown in steps 530 and 540, if the estimated latency of the data packets 151 in the data queue 150 are below a predetermined threshold level, then the depth of the data queue 150 may be increased accordingly.

An advantage of the present invention over conventional techniques and apparatus is that it controls the transmit latency of prioritized data inexpensively and reliably, without necessitating a commensurate reduction in throughput.

The present invention can be implemented in virtually any product that transmits prioritized data within the general constraint of a desirable transmit latency. A dynamically limited queue depth has particular application in networks utilized to transmit audio and video together with lower priority data.

While the invention has been described with reference to the exemplary embodiments thereof, those skilled in the art will be able to make various modifications to the described embodiments of the invention without departing from the true spirit and scope of the invention.

What is claimed is:

1. A data packet queue, comprising:
   a plurality of software queues including data packets having a plurality of priorities associated therewith;
   a priority queuing module adapted to submit to a hardware data queue data packets pulled from said plurality of software queues in accordance with a priority of said data packets; and
   a priority history module adapted to monitor a history of priority levels of data packets submitted to said hardware data queue;
   wherein a depth of said hardware data queue is adaptively limited based on said monitored history of said priority levels of data packets submitted to said hardware data queue.

2. The data packet queue according to claim 1, further comprising:
   a timer to measure history for said priority history module.

3. The data packet queue according to claim 1, further comprising:
   a plurality of software data queues each comprising data packets of respective priority levels.

4. The data packet queue according to claim 1, wherein:
   said depth of said hardware data queue is shortened when said monitored history indicates a lack of highest priority data packets having been submitted to said hardware data queue.

5. The data packet queue according to claim 1, wherein:
   said depth of said hardware data queue is lengthened when said monitored history indicates that highest priority data packets have been submitted to said hardware data queue.

6. A data packet queue, comprising:
   a priority queuing module adapted to submit to a hardware data queue data packets in accordance with a priority of said data packets;
   a priority history module adapted to monitor a history of priority levels of data packets submitted to said hardware data queue; and
   a latency estimator adapted to estimate a latency of data packets in said hardware data queue;
   wherein said depth of said hardware data queue is adaptively limited based on said monitored history of said priority levels of data packets and on said estimated latency of said data packets in said hardware data queue.

7. A method of balancing latency with throughput in a single data packet queue containing a plurality of data packets each having one of a plurality of priorities, comprising:
   determining a priority level history with respect to past submissions to said single data packet queue of a plurality of data packets having a plurality of priorities; and
   adaptively adjusting a depth of said single data packet queue based on said determined priority level history.

8. The method of balancing latency with throughput in a single data packet queue containing a plurality of data packets each having one of a plurality of priorities according to claim 7, wherein:
   said priority level history is determined with respect to a recentness of said past submissions to said single data packet queue.

9. The method of balancing latency with throughput in a single data packet queue containing a plurality of data packets each having one of a plurality of priorities according to claim 7, wherein:
   said priority level history is determined with respect to a periodicity of said past submissions to said single data packet queue.

10. The method of balancing latency with throughput in a single data packet queue containing a plurality of data packets each having one of a plurality of priorities according to claim 7, further comprising:
    timing history with respect to past submissions to said single data packet queue.

11. The method of balancing latency with throughput in a single data packet queue containing a plurality of data packets each having one of a plurality of priorities according to claim 7, further comprising:
    counting a number of past submissions to said single data packet queue to determine a length of time for said priority level history.

12. The method of balancing latency with throughput in a single data packet queue containing a plurality of data packets each having one of a plurality of priorities according to claim 7, further comprising:
    separately pre-queuing data packets of respectively different priority levels before submission to said single data packet queue.

13. The method of balancing latency with throughput in a single data packet queue containing a plurality of data packets each having one of a plurality of priorities according to claim 7, wherein:

said single data packet queue is a transmit data queue.

14. The method of balancing latency with throughput in a single data packet queue containing a plurality of data packets each having one of a plurality of priorities according to claim 7, wherein said step of adaptively adjusting comprises:

shortening said depth of said single data packet queue when said monitored history indicates a lack of highest priority data packets having been submitted to said single data packet queue.

15. The method of balancing latency with throughput in a single data packet queue containing a plurality of data packets each having one of a plurality of priorities according to claim 7, wherein said step of adaptively adjusting comprises:

lengthening said depth of said single data packet queue when said monitored history indicates that highest priority data packets have been submitted to said single data packet queue.

16. A method of balancing latency with throughput in a data packet queue, comprising:

determining a priority level history with respect to past submissions to said data packet queue;

adaptively adjusting a depth of said data packet queue based on said determined priority level history;

estimating a latency of data packets in said data packet queue; and qualifying said depth of said data queue based on said estimated latency of said data packets in said data packet queue.

17. Apparatus for balancing latency with throughput in a single data packet queue containing a plurality of data packets each having one of a plurality of priorities, comprising:

means for determining a priority level history with respect to past submissions to said single data packet queue of a plurality of data packets having a plurality of priorities; and means for adaptively adjusting a depth of said single data packet queue based on said determined priority level history.

18. The apparatus for balancing latency with throughput in a single data packet queue containing a plurality of data packets each having one of a plurality of priorities according to claim 17, further comprising:

means for timing history with respect to recent submissions to said single data packet queue.

19. The apparatus for balancing latency with throughput in a single data packet queue containing a plurality of data packets each having one of a plurality of priorities according to claim 17, further comprising:

means for counting a number of past submissions to said single data packet queue to determine a length of time for said priority level history.

20. The apparatus for balancing latency with throughput in a single data packet queue containing a plurality of data packets each having one of a plurality of priorities according to claim 17, further comprising:

means for separately pre-queuing data packets of respectively different priority levels before submission to said single data packet queue.

21. The apparatus for balancing latency with throughput in a single data packet queue containing a plurality of data packets each having one of a plurality of priorities according to claim 17, wherein:

said single data packet queue is a transmit data queue.

22. The apparatus for balancing latency with throughput in a single data packet queue containing a plurality of data packets each having one of a plurality of priorities according to claim 17, wherein said means for adaptively adjusting comprises:

means for shortening said depth of said single data packet queue when said monitored history indicates a lack of highest priority data packets having been submitted to said single data packet queue.

23. The apparatus for balancing latency with throughput in a single data packet queue containing a plurality of data packets each having one of a plurality of priorities according to claim 17, wherein said means for adaptively adjusting comprises:

means for lengthening said depth of said single data packet queue when said monitored history indicates that highest priority data packets have been submitted to said single data packet queue.

24. Apparatus for balancing latency with throughput in a data packet queue, comprising:

means for determining a priority level history with respect to past submissions to said data packet queue;

means for adaptively adjusting a depth of said data packet queue based on said determined priority level history;

means for estimating a latency of data packets in said data packet queue; and means for qualifying said depth of said data packet queue based on said estimated latency of said data packets in said data packet queue.

* * * * *